(12) United States Patent
Mitsch

(10) Patent No.: US 8,991,800 B2
(45) Date of Patent: Mar. 31, 2015

(54) ASYMMETRICAL MOUNTING

(76) Inventor: Franz Mitsch, Heppenheim (DE)

( * ) Notice: Subject to any disclaimer, the term of this patent is extended or adjusted under 35 U.S.C. 154(b) by 161 days.

(21) Appl. No.: 13/127,502

(22) PCT Filed: Nov. 12, 2009

(86) PCT No.: PCT/EP2009/008044
§ 371 (c)(1),
(2), (4) Date: May 4, 2011

(87) PCT Pub. No.: WO2010/054808
PCT Pub. Date: May 20, 2010

(65) Prior Publication Data
US 2011/0210490 A1      Sep. 1, 2011

(30) Foreign Application Priority Data
Nov. 17, 2008   (EP) ..................................... 08019999

(51) Int. Cl.
| F16F 1/40 | (2006.01) |
| F16D 3/70 | (2006.01) |
| F16F 1/393 | (2006.01) |
| F16F 1/41 | (2006.01) |

(52) U.S. Cl.
CPC ............... *F16D 3/70* (2013.01); *F16F 1/3935* (2013.01); *F16F 1/41* (2013.01)
USPC ....................................... 267/294; 267/141.1

(58) Field of Classification Search
USPC .......... 403/224, 225, 226, 227, 228, 335, 337, 403/372; 267/292, 293, 294, 140.5, 141, 267/141.1, 141.2, 141.3, 141.7; 248/556, 248/557, 560, 603, 605, 612, 613, 632, 634, 248/638
See application file for complete search history.

(56) References Cited

U.S. PATENT DOCUMENTS

| | | | | | |
|---|---|---|---|---|---|
| 1,731,837 | A | * | 10/1929 | Wood | 180/291 |
| 1,815,442 | A | * | 7/1931 | Masury | 248/557 |
| 2,179,959 | A | * | 11/1939 | Schroedter | 403/224 |
| 2,838,339 | A | * | 6/1958 | Schaldenbrand | 296/35.1 |
| 2,891,743 | A | * | 6/1959 | Bligard et al. | 248/557 |
| 2,935,347 | A | * | 5/1960 | Liversage | 403/227 |
| 3,159,391 | A | * | 12/1964 | Barenyi et al. | 267/294 |
| 3,239,036 | A | * | 3/1966 | Scott | 403/408.1 |
| 3,304,043 | A | * | 2/1967 | Beck | 267/140.5 |
| 4,014,588 | A | * | 3/1977 | Kohriyama | 296/35.1 |
| 4,391,436 | A | * | 7/1983 | Fishbaugh | 267/141.1 |
| 4,717,094 | A | * | 1/1988 | Chee | 244/54 |
| 4,858,880 | A | * | 8/1989 | Durand | 248/635 |
| 4,859,148 | A | * | 8/1989 | Hibyan | 416/134 A |

(Continued)

FOREIGN PATENT DOCUMENTS

| EP | 1 593 867 A1 | 11/2005 |
| EP | 1 832 500 A2 | 9/2007 |
| GB | 719 734 | 12/1954 |

*Primary Examiner* — Nicholas J Lane
(74) *Attorney, Agent, or Firm* — Davis & Bujold, PLLC; Michael J. Bujold

(57) ABSTRACT

An elastomeric bearing arrangement for the reduction of machine vibrations caused predominantly by externally acting forces. The bearing, due to its special design and construction symmetry, is capable of processing the forces occurring in all spatial directions with optimal material protection. The bearing is preferably suitable for a rotational connection of rotor/gearbox units to the support plate in wind turbines. The bearing has a sandwich element (5), a cone element (3), a cone piece (4) and a cylinder piece (4a) which interact with one another.

16 Claims, 3 Drawing Sheets

(56) References Cited

U.S. PATENT DOCUMENTS

| | | | |
|---|---|---|---|
| 4,957,403 A * | 9/1990 | Corain et al. | 411/368 |
| 5,248,134 A * | 9/1993 | Ferguson et al. | 267/220 |
| 5,405,118 A * | 4/1995 | Dietz et al. | 248/632 |
| 5,765,819 A * | 6/1998 | Hummel | 267/153 |
| 6,030,016 A * | 2/2000 | Rice | 296/35.1 |
| 6,065,742 A * | 5/2000 | Whiteford | 267/140.5 |
| 7,048,265 B2 * | 5/2006 | Huprikar | 267/141.1 |
| 7,389,977 B1 * | 6/2008 | Fernandez et al. | 267/141.4 |
| 7,416,244 B2 | 8/2008 | Polk et al. | |
| 2002/0038928 A1 * | 4/2002 | Rice et al. | 267/153 |

* cited by examiner

ASYMMETRICAL MOUNTING

This application is a National Stage completion of PCT/EP2009/008044 filed Nov. 12, 2009, which claims priority from European Patent application serial no. 08019999.5 filed Nov. 17, 2008.

FIELD OF THE INVENTION

The invention relates to an elastomeric bearing arrangement for the reduction of machine vibrations caused predominantly by externally acting forces. Owing to its special design and construction symmetry, it is capable of processing the forces occurring in all spatial directions with optimal material protection. The bearing according to the invention is preferably suitable for a connection, arranged in a circular manner, of rotor/gearbox units to the bedplate in wind turbines.

BACKGROUND OF THE INVENTION

Diverse bearings are described for these purposes in the prior art. A solution which is already very usable is described in EP 1 593 867 B1, but this uses a special coupling. A bearing of this type is formed by the tensioning of two cone elements lying against one another and is depicted diagrammatically in FIG. 1. The force transmission in the case of this double-cone bearing takes place from the gearbox flange (2) to the bedplate (1) via the two tensioned diametrical cone bearings (10), which are supported unilaterally and pre-tensioned by the cone pieces (8) and (9). The pre-tensioning is carried out by means of the screw (7). The system allows perfect force transmission, but still has the following disadvantage: on introduction, for example, of a torsion moment around the rotor shaft axis, which is transmitted by all bearings in each case by a radial force in these bearings—the radial force acts in the case of the cone elements (10) in the center of the respective cone bearing, so that the resultant radial force acts approximately in the center between the two cones (8, 9). This results in a bending moment, which must be transmitted between the two cones (8, 9) and the machine flange (1). The transmission of this moment takes place via the separating surface (11) and the separating surface between cone (8) and the flange (1), and the screw connection (7). In order that the connection is not damaged, the resultant loading of the separating surfaces and the screw connection requires sufficiently large dimensioning of the contact surfaces and the screw connection. This may have the consequence that the physical size of the system as a whole increases significantly.

SUMMARY OF THE INVENTION

The object was thus to provide a bearing for the said purposes which avoids or at least significantly reduces the said disadvantages, in particular the bending moments occurring in the region of the screw connection (7) and the cones (8, 9), but at the same time ensures the advantages of optimized vibration reduction, as described in EP 1 593 867 B1.

BRIEF DESCRIPTION OF THE DRAWINGS

This object has been achieved by means of the present invention, as described below and specified by the claims. The bearing arrangement according to the invention is depicted graphically in the Figures in which:

DETAILED DESCRIPTION OF THE PREFERRED EMBODIMENTS

Figure 1:
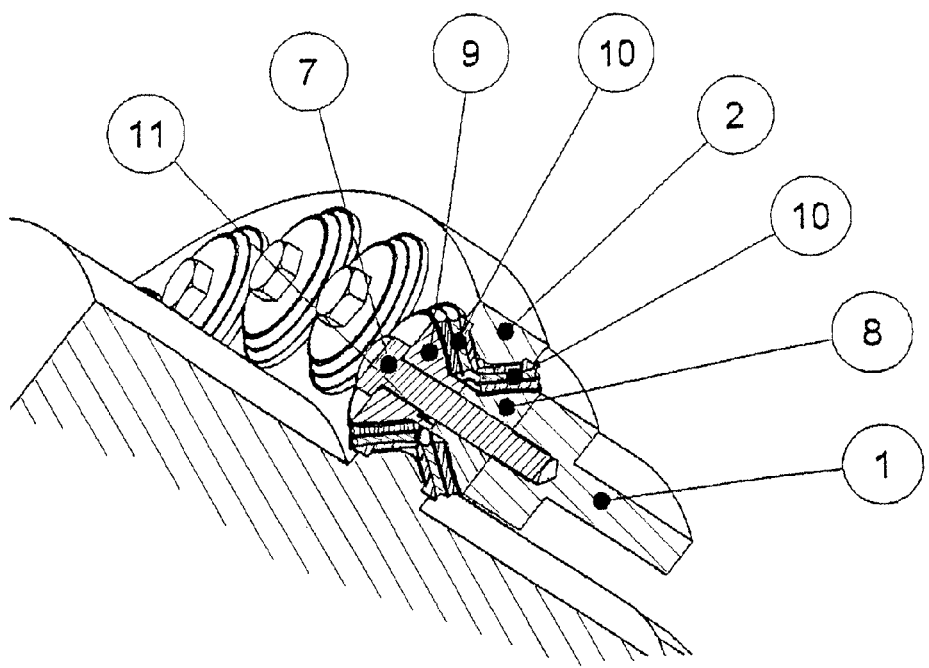
FIG. 1 Conventional elements arranged in a circular manner.
Figure 2:
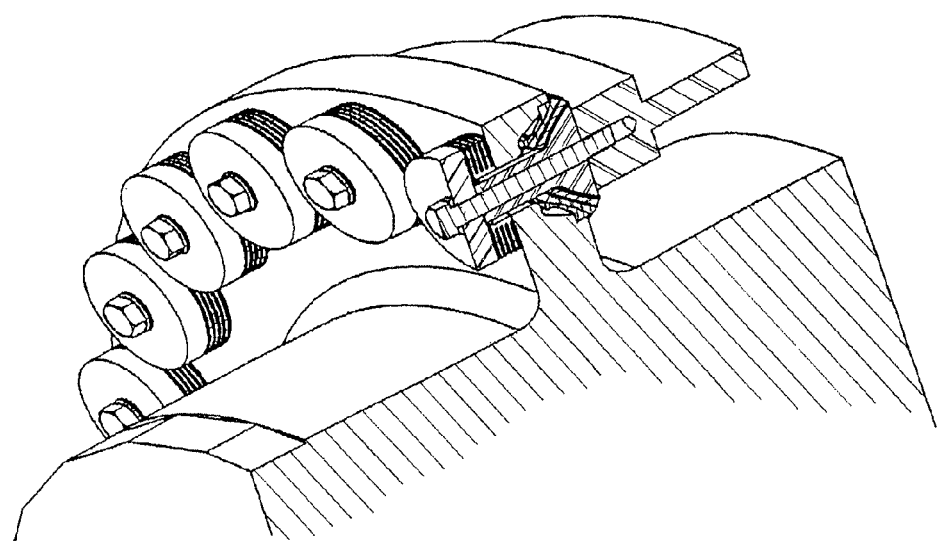
FIG. 2 Circular arrangement of the elements in accordance with the invention.
Figure 3:
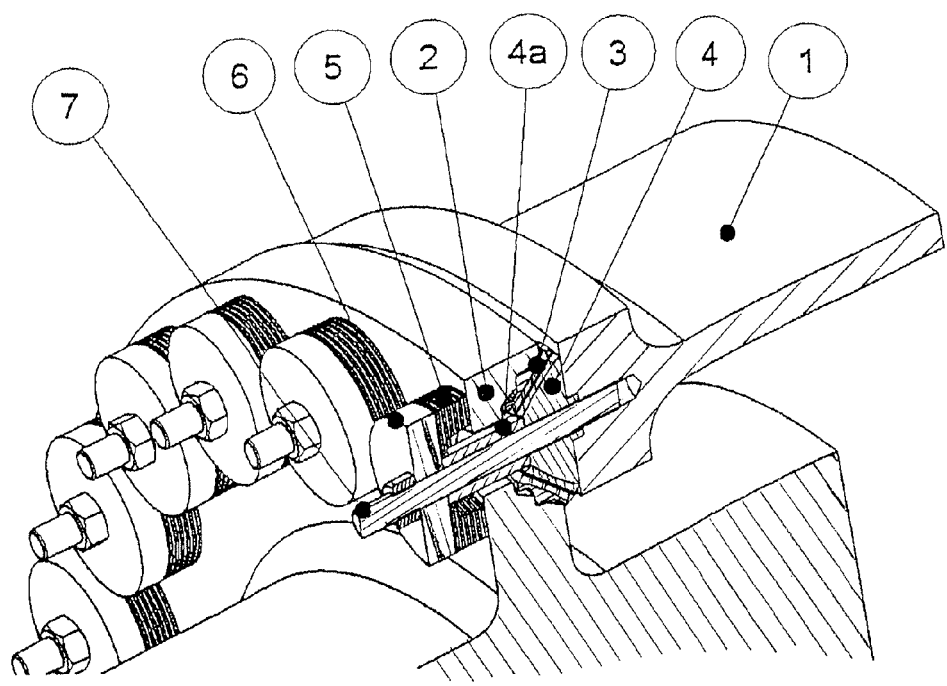
FIG. 3 Section through a bearing in accordance with the invention.

The invention thus relates to an elastic machine or gearbox bearing for the transmission of the forces and moments occurring in all spatial directions, in particular axially and radially, and for the reduction or isolation of vibrations occurring, which comprises an axially oriented elastomeric sandwich element (5) and an elastomeric cone element (3), which is installed above or below the former and whose axis is oriented perpendicular to the sandwich element (5) and whose tapered end is positioned against this sandwich element (5), where the elements (3) and (5) are connected to one another by a cone piece (4), which is surrounded centrally by the cone element (3), and a cylinder piece (4a), which is surrounded centrally by the sandwich element (5), and each of the elements (3), (5), (4), (4a) has a central axially oriented hole for the accommodation of a clamping bolt or a clamping screw (7) for clamping a machine part (2), which is introduced between the elastomeric elements (3) and (5) and generally functions as clamping flange, to the machine part (1), which is installed below the element (3) and functions as attachment flange.

In accordance with the invention, the elastic force-transmission moment now consists of an elastic cone element (3) and an elastic sandwich element (5), which is axially clamped thereto. Whereas the cone element (3) transmits axial forces and radial forces, the sandwich element (5) transmits virtually exclusively axial forces. The resultant total force acting on the bearing according to the invention now acts in the region of the cone piece (4) with a widened cross section, so that the bending moment formed no longer acts on the narrow connecting piece (4a) or the clamping means (7) to this extent and no longer results in a loosening of the attachment or in material fatigue.

The stiffness of the sandwich element (5) is, in accordance with the invention, approximately a factor of 2-100, preferably 10-100, in particular 50-100, smaller than the radial stiffness of the cone element (3).

The radial force transmission in the bearing also takes place in accordance with the radial stiffness ratio. Thus, about 2-100 times as much radial force is transmitted in the cone element (3) as in the sandwich element (5). The radial force transmission in (5) is thus negligible. This has the consequence that a large bending moment does not have to be transmitted in the cone piece (4), which results in alleviation of the load on the cylinder piece (4a), which is adjacent to the cone piece (4) and through which the clamping means (7) is also passed, so that this and also the clamping means merely have to be dimensioned for the tensile and compression forces arising.

The introduction of load from the cone piece (4) into the attachment flange (1) is also simplified by the fact that virtually pure shear has to be transmitted here and the bending moment is significantly smaller than in the prior-art design in accordance with FIG. 1. In an embodiment of the invention, cone piece (4) and attachment flange (1) can also be integral constituents of a single component.

In principle, the cone piece (4) and the cylinder piece (4a) can also be a single workpiece.

The two elements are thus clamped to one another in the axial direction. The two elements may have the same stiffness in the axial direction, but this is not absolutely necessary.

However, the cone element (3) has significantly greater stiffness in the radial direction than the sandwich element (5).

The pre-tensioning and axial force transmission in the case of the sandwich element preferably take place via a pressure plate (6), which is provided with a hole which is able to accommodate the clamping bolt or the clamping screw (7).

The invention thus relates to a corresponding bearing which has a pressure plate which is in direct or indirect contact with the sandwich element (5).

In a particular embodiment, the pressure plate (6) and the sandwich element (5) form a constructional unit.

It has furthermore been found that the force distribution over the entire bearing element is particularly advantageous if the fixed, non-elastic, conical cone piece (4) is not formed by a simple cone surface, but instead has convex curvature. The effect can be reinforced further if the elastomeric cone element (3) furthermore also has corresponding concave curvature on the inside and preferably also on the outside, so that its inside surface can come to rest on the outside surface of the cone piece (4) with an accurate fit.

In a further embodiment, the cone piece (4) with the cylinder piece (4a) can form a constructional unit.

The invention thus relates to a corresponding bearing in which the cone piece (4) has a surface with convex curvature on which the inside surface of the cone element (3) lies. In a further embodiment, the components (3) and (4) may again in accordance with the invention be combined to form a single constructional unit.

The invention also relates to a corresponding bearing in which the inside surface of the cone element (3) has concave curvature, and preferably also in addition the outside surface of the cone element (3) has concave curvature.

The elastomer elements (3) and (5) have 1 or more elastomer layers. In general, they essentially consist of at least two elastomer layers, which are separated by a stiff interlayer, usually a metal plate. The elements preferably consist of three to five elastomeric layers with corresponding intermediate plates or interlayers. The elements are terminated on the outside by likewise stiff layers/plates.

The elastomer materials used for the bearings according to the invention essentially consist of a natural rubber, a natural rubber derivative or of a suitable elastic polymeric plastic or plastic mixture. In accordance with the invention, the elastomer layer may have different hardness ("Shore hardness") and different damping properties, corresponding to the desired requirements. Elastomers having a hardness of 20 to 100 Shore A, in particular 30 to 80 Shore A, are preferably used. The preparation of such elastomers of different hardness is known from the prior art and is adequately described in the relevant literature.

In accordance with the invention, the stiff intermediate plates or interlayers are made from materials having high stiffness, high strength and low compressibility. These are preferably metal sheets, but other materials, such as hard plastics, composite materials or carbon fiber-containing materials, can also be employed. The intermediate metal sheets and the elastomer materials are generally connected to one another during vulcanization.

The cone element (3) of the bearing according to the invention should have a cone angle of 10-50° with respect to machine axis (a) or to the axis of the clamping element (7) against or in the screw-in direction. It preferably has a cone angle of 25-50°.

The bearing according to the invention is versatile and can be employed in different ways. As a so-called unilateral bearing arrangement, it is particularly suitable for wind turbines in order to produce, in particular, a rotational elastic connection between the rotor shaft, the gearbox or a rotor/gearbox unit and the bedplate.

However, it can also be employed in couplings as described in EP 1 593 867 B1 instead of the elastomer bearings mentioned therein.

The bearing according to the invention can also be employed as tower decoupling in wind turbines, as described in EP 1 065 374 B1, which additionally results in simplification.

It is likewise possible to improve machine feet in accordance with EP 1 065 374 B1 in that the bending moment between the flanges having the design described can be reduced and the screw forces can thus be decreased.

REFERENCE NUMERALS

1 Attachment flange
2 Clamping flange
3 Elastomeric cone element
4 Cone piece
4a Cylinder piece
5 Elastomeric sandwich element
6 Pressure plate
7 Clamping means (screw/bolt)
8 Cone piece clamping side
9 Cone piece supported unilaterally
10 Symmetrical elastomeric cone bearing
11 Separation between the cones

The invention claimed is:

1. An elastic machine or gearbox bearing for damping of bending moments and vibrations occurring between a rotary-gearbox unit and a bedplate of a wind turbine, the bearing defining an axis and comprising:
    an axially oriented elastomeric sandwich element (5) comprising a plurality of elastomeric layers that extend normally to the axis of the bearing;
    an elastomeric cone element (3) being installed with respect to the axis of the bearing either above or below the sandwich element (5) and defining an axis that is coaxial with the axis of the bearing and oriented perpendicular to the elastomeric layers of the sandwich element (5), and the cone element has a tapered end that is tapered inwardly toward the sandwich element (5);
    the cone element (3) and the sandwich element (5) being connected to one another by a cone piece (4), the cone piece has an axial end face and is centrally surrounded with respect to the axis of the bearing by the cone element (3), and a cylinder piece (4a) that is coaxially aligned with the axis of the bearing and which is centrally surrounded by the sandwich element (5), the cylinder piece having concentric radially inner and radially outer cylindrical surfaces and one axial end face of the cylinder piece abuts the axial end face of the cone piece,
    each of the cone element (3), the sandwich element (5), the cone piece (4) and the cylinder piece (4a) having a central hole, which are axially aligned and through which either a clamping bolt or a clamping screw (7) passes, the clamping bolt or the clamping screw passes completely through the central hole of the cone piece and is threadably secured within a threaded bore of an attachment flange for clamping a clamping flange (2) to the attachment flange, the clamping flange is supported axially between the elastomeric cone element (3) and the elastomeric sandwich element (5), the attachment flange (1) is installed axially below the cone element (3); and the cone element (3) has a greater stiffness, in a radial direction, than the sandwich element (5), and the sandwich element is independent of and axially spaced from the cone element, thereby a resulting total force acting on the bearing, acts in a region of the cone piece (4) with a widened cross section, and the bending moment no longer acts on the narrow cylinder piece (4a) and the clamping bolt or the clamping screw.

2. The bearing according to claim 1, wherein the sandwich element (5) and a pressure plate (6) represent a constructional unit, the one axial end face of the cylinder piece and an axially opposite end of the cylinder piece each have an end surface that extends radially between the inner and the outer cylindrical surfaces, the end surface of the one axial end face of the cylinder piece faces and abuts the axial end face of the cone piece, and the end surface of the axially opposite end of the cylinder piece faces and abuts the pressure plate which clamps the sandwich element to the clamping flange.

3. The bearing according to claim 1, wherein the cone piece (4) and the elastomeric cone element (3) are integrally coupled to each other.

4. An elastic machine or gearbox bearing for damping of bending moments and vibrations occurring between a rotary-gearbox unit and a bedplate of a wind turbine, the bearing defining an axis and comprising:

an axially oriented elastomeric sandwich element (5) comprising a plurality of elastomeric layers that extend normally to the axis of the bearing;

an elastomeric cone element (3) being installed with respect to the axis of the bearing either above or below the sandwich element (5) and defining an axis that is coaxial with the axis of the bearing and oriented perpendicular to the elastomeric layers of the sandwich element (5), and the cone element has a tapered end that is tapered inwardly toward the sandwich element (5);

the cone element (3) and the sandwich element (5) being connected to one another by a cone piece (4), the cone piece is centrally surrounded with respect to the axis of the bearing by the cone element (3), and a cylinder piece (4a) that is coaxially aligned with the axis of the bearing and which is centrally surrounded by the sandwich element (5), each of the cone element (3), the sandwich element (5), the cone piece (4) and the cylinder piece (4a) having a central hole, which are axially aligned and through which either a clamping bolt or a clamping screw (7) passes, the clamping bolt or the clamping screw extends completely through the central hole of the cone piece and is threadably secured within a threaded bore of an attachment flange for clamping a clamping flange (2) to the attachment flange, the clamping flange is supported axially between the elastomeric cone element (3) and the elastomeric sandwich element (5), the attachment flange (1) is installed on a side of the cone piece that is axially opposite from the cone element (3);

the cone element (3) has a greater stiffness, in a radial direction, than the sandwich element (5), and the sandwich element is independent of and axially spaced from the cone element, thereby a resulting total force acting on the bearing, acts in a region of the cone piece (4) with a widened cross section, and the bending moment no longer acts on the narrow cylinder piece (4a) and the clamping bolt or the clamping screw; and the cone piece (4) and the cylinder piece (4a) are a single component, and the cylinder piece comprises concentric inner and outer cylindrical surfaces.

5. The bearing according to claim 1, wherein the cone piece (4) and the attachment flange (1) are integrally coupled to each other, and the cone piece and the cone element are tapered inwardly only in one direction.

6. The bearing according to claim 1, wherein a pressure plate (6) has a central hole for accommodating the clamping bolt or the clamping screw (7) and is installed with respect to the axis of the bearing above the sandwich element (5) such that the sandwich element directly contacts the pressure plate and the clamping flange.

7. The bearing according to claim 1, wherein the cone piece (4) has a radially outer surface with a convex curvature and on which a radially inside surface of the cone element (3) lies.

8. The bearing according to claim 7, wherein the radially inside surface of the cone element (3) has a concave curvature.

9. The bearing according to claim 8, wherein a radially outside surface of the cone element (3) has a concave curvature.

10. The bearing according to claim 1, wherein the cone element (3) comprises at least two elastomeric layers, the at least two elastomeric layers of the cone element are separated by a non-elastic interlayer and the plurality of elastomeric layers of the sandwich element are separated by a non-elastic interlayer.

11. The bearing according to claim 1, wherein the cone element (3) has a cone angle of between 10-50° relative to an axis of the clamping element (7) in a screw-in direction, the axis of the clamping element being coaxial with the axis of bearing.

12. The bearing according to claim 11, wherein the cone angle is between 25-35°.

13. The bearing according to claim 4, wherein the cone element (3) has a cone angle of between 10-50° relative to an axis of the clamping element (7) against a screw-in direction, the axis of the clamping element being coaxial with the axis of bearing.

14. The bearing according to claim 13, wherein the cone angle is between 25-35°.

15. The bearing according to claim 1, wherein the bearing damps vibration forces of machine parts moving with respect to one another in all spatial directions.

16. The bearing according to claim 1, wherein the bearing forms a rotational elastic connection between one of a gearbox, a rotor shaft and the rotary-gearbox unit and the bedplate of the wind turbines.

* * * * *